(12) United States Patent
Umetsu

(10) Patent No.: US 6,230,690 B1
(45) Date of Patent: May 15, 2001

(54) FUEL SUPPLY APPARATUS FOR VEHICLE

(75) Inventor: Kunihiro Umetsu, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/271,918

(22) Filed: Mar. 18, 1999

(30) Foreign Application Priority Data

Mar. 19, 1998 (JP) ................................... 10-069956
Mar. 19, 1998 (JP) ................................... 10-069961

(51) Int. Cl.[7] .................................................. F02M 37/04
(52) U.S. Cl. ...................... 123/509; 123/510; 137/565.01
(58) Field of Search ................................. 123/509, 514, 123/510, 516; 137/565.01, 565.2, 571, 576, 581, 565.17

(56) References Cited

U.S. PATENT DOCUMENTS

| | | | | |
|---|---|---|---|---|
| 3,910,464 | * | 10/1975 | Schlansky | 137/565.01 |
| 4,304,530 | * | 12/1981 | Gens | 137/565.01 |
| 4,672,937 | * | 6/1987 | Fales | 123/509 |
| 4,716,931 | * | 1/1988 | Shibamoto | 123/509 |
| 5,040,516 | * | 8/1991 | Haraguchi | 123/509 |
| 5,046,471 | * | 9/1991 | Schmid | 123/509 |
| 5,080,077 | * | 1/1992 | Sawert | 123/509 |
| 5,394,902 | * | 3/1995 | Shibao | 123/509 |
| 5,522,425 | * | 6/1996 | Kroiss | 137/565.17 |
| 5,669,359 | | 9/1997 | Kleppner et al. . | |
| 5,762,049 | * | 6/1998 | Jones | 123/509 |
| 5,992,394 | * | 11/1999 | Mukaidani | 123/509 |

* cited by examiner

*Primary Examiner*—Carl S. Miller
(74) *Attorney, Agent, or Firm*—Nixon & Vanderhye PC

(57) ABSTRACT

A subtank is connected to a bracket fitted in an opening of a fuel tank via a L-shaped sliding plate. The L-shaped plate is movably supported by the bracket, and the subtank is rotatably supported by the L-shaped plate. A spring force is applied to the subtank toward the fuel tank by a spring via the L-shaped plate. Accordingly, a fuel supply apparatus is easily installed in a flat fuel tank without enlarging the opening of the fuel tank.

4 Claims, 8 Drawing Sheets

FUEL SUPPLY APPARATUS FOR VEHICLE

CROSS REFERENCE TO RELATED APPLICATIONS

This application is based upon and claims priority from Japanese Patent Application Nos. H. 10-69956, filed Mar. 19, 1998, and H. 10-69961, filed Mar. 19, 1998, the contents of which are incorporated herein by reference.

BACKGROUND OF THE INVENTION

1. Field of the Invention

The present invention relates to a fuel supply apparatus for a vehicle, and particularly to an in-tank type fuel supply apparatus having a subtank, containing a fuel pump, disposed at the bottom of a fuel tank.

2. Description of Related Art

In-tank type fuel supply apparatus proposed in a related art includes a subtank-on-bottom type fuel supply apparatus having a construction wherein a subtank with a built-in fuel pump is held vertically movably by a bracket for covering an opening of a fuel tank in which the fuel supply apparatus is installed and the subtank is pressed against the bottom of the fuel tank by a spring.

In U.S. Pat. No. 5,669,359 there is proposed a subtank-on-bottom type fuel supply apparatus having a construction wherein a subtank is joined by a barlike elastic member to a bracket for covering the opening of a fuel tank and the subtank is pressed against the bottom of the fuel tank by a bending urging force of the barlike elastic member.

These subtank-on-bottom type fuel supply apparatuses have the advantage that because a fuel inlet in the bottom face of the subtank always follows the fuel tank bottom, irrespective of the attitude of the vehicle and the shape of the bottom of the fuel tank, the supply of fuel to the fuel pump can be made smooth, furthermore, when a fuel level detecting apparatus is provided in the subtank, the fuel level can be detected accurately irrespective of changes in the position of the bottom of the fuel tank.

However, with the first of the aforementioned subtank-on-bottom type fuel supply apparatuses, because a subtank having a certain necessary capacity must be inserted into the fuel tank through an opening in the fuel tank having a limited size, inevitably the height of the subtank must be increased. As a result, this type of fuel supply apparatus cannot be used in a shallow fuel tank. Because fuel tanks can have any of a variety of shapes depending on the type of the vehicle, then, this type of fuel supply apparatus can only be used in a limited number of fuel tanks. Of course, if the opening of the fuel tank were to be enlarged, it would be possible to reduce the height of the subtank while maintaining the necessary capacity; however, enlarging of the opening is undesirable from the standpoints of maintaining the strength of the fuel tank and preventing the diffusion of fuel vapor.

With the second of the aforementioned subtank-on-bottom type fuel supply apparatuses described above, on the other hand, especially if the subtank has a float or the like for level detection, the front-rear direction dimension of the subtank after it seats on the bottom of the fuel tank is much greater than its height. Consequently, with the subtank-on-bottom type fuel supply apparatus using a barlike elastic member disclosed in the above-mentioned patent, when the subtank is inserted into the fuel tank through the fuel tank opening, it has been necessary to turn the subtank through about 90° inside the fuel tank.

Accordingly, the barlike elastic member has had to be strongly elastically deformed while this turning and insertion operation is carried out, the operation has been complicated, and also special construction measures such as increasing the strength of the relevant portions of the bracket and the subtank supporting the ends of the barlike elastic member have been necessary. Of course, if the opening of the fuel tank were to be enlarged, the insertion of the subtank would be easy; however, as mentioned above, enlarging of the opening is undesirable from the standpoint of maintaining the strength of the fuel tank and preventing the diffusion of fuel vapor.

A bottom-reference fuel sender gauge (fuel level sensor) is also known, for being mounted on a subtank pressed against a fuel tank bottom by a spring. Unlike a fuel sender gauge of the type to be fixed to the top of a fuel tank, because this bottom-reference fuel sender gauge can follow vertical movements of the fuel tank integrally with the subtank, it can measure the position of the liquid surface relatively accurately.

However, in recent years, to make effective use of vehicle space, the trend has been for fuel tanks to become flatter, and this kind of fuel tank which in vertical section is flat will bend under fuel weight or under tank internal pressures accompanying vapor formation from fuel.

As a result of such bending, fuel collects in the bent part, and when the liquid surface height at the position of the float consequently falls with respect to the fuel tank bottom, notwithstanding that the actual amount of fuel in the fuel tank has not changed, the angle of the float with respect to a reference position constituting a fuel empty point decreases. Consequently it is erroneously detected that the amount of fuel remaining has decreased. That is, even with a so-called bottom-reference fuel sender gauge, if the liquid surface position at the float changes relatively due to fuel there will be an increase in erroneous collecting in a bent part, the error of the liquid position detection.

In U.S. Pat. No. 5,669,359 there is disclosed an apparatus is disclosed wherein a subtank and a flange are joined by a spring capable of following up bending and the subtank is made to follow up bending while changing its horizontal position relative to the flange position.

However, because, as a consequence of the structure of the apparatus, repetitive stress acts on the spring constantly, and furthermore the frequency of repetition and the size of this stress depend on the pattern of change of the internal pressure of the fuel tank, there are problems in securing an adequate apparatus lifetime.

Also, to the extent that the horizontal position of the subtank relative to the flange position is liable to shift under outside forces, it may not be possible to secure a subtank reserve when parking on a slope, and a desired turning performance cannot be obtained.

SUMMARY OF THE INVENTION

The present invention is made in light of the foregoing problems, and it is an object of the present invention to provide a vehicle fuel supply apparatus which can be fitted easily even to a shallow fuel tank without enlarging the opening of the fuel tank.

It is another object of the present invention to provide a vehicle fuel supply apparatus having minimized liquid level detection error and improved durability.

According to the present invention, a fuel supply apparatus for a vehicle has a bracket to be fitted in an opening of a vehicle fuel tank and which is joined to a subtank by a connecting member and the connecting member is held by the bracket and supports the subtank rotatably and by way of the connecting member an elastic member urges the subtank against the bottom of the fuel tank.

The subtank is first inserted from front surface thereof through the opening in the fuel tank and then is inserted further into the fuel tank while being rotated in a predetermined rotation plane, and after about 90° of rotation the bottom surface of the subtank seats upon the bottom of the fuel tank.

With this construction, even if the fuel tank is shallow, the subtank can be smoothly received into the fuel tank without the opening of the fuel tank being enlarged and without the connecting member being made elastically bendable, and furthermore the construction and the insertion operation are simple.

Also, by the shape of the connecting member being suitably changed, the fuel supply apparatus may easily be applicable to a deep tank or a shallow tank.

The subtank may be rotatably supported by distal end of L-shaped connecting member and disposed at a periphery of an area right beneath the bracket.

By this means, the apparatus can be applied to a still shallower fuel tank.

According to another aspect of the present invention, the subtank may be rotatably supported by the distal end of a straight barlike connecting member extending vertically, and thus disposed directly below the bracket.

Accordingly, there is no twisting of a guide part of the bracket for guiding the connecting member vertically and it is possible to realize improved durability of this guide part and improved mobility of the subtank.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
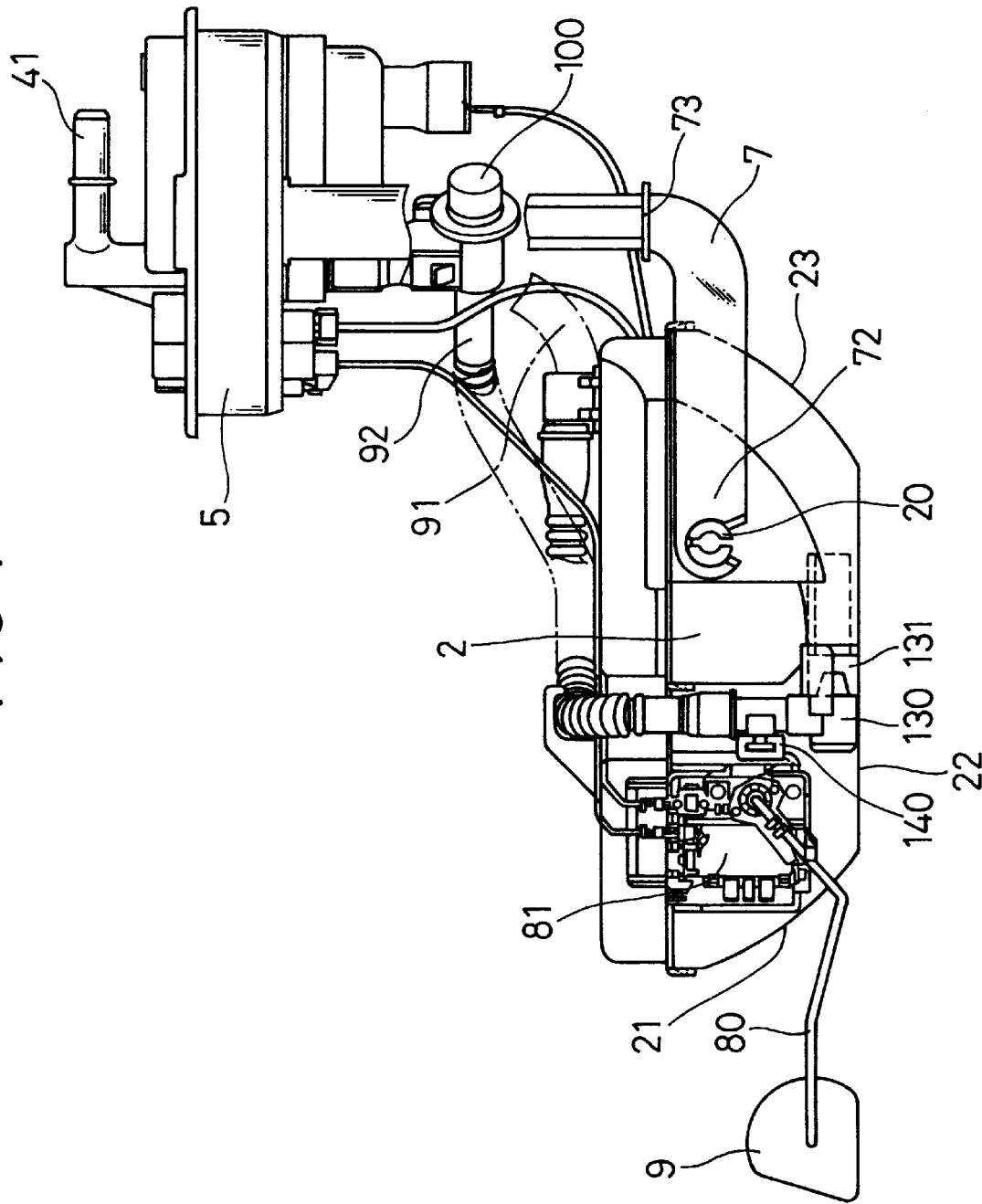
FIG. 1 is a schematic illustration showing a fuel supply apparatus for a vehicle according to a first embodiment of the present invention.
Figure 2:
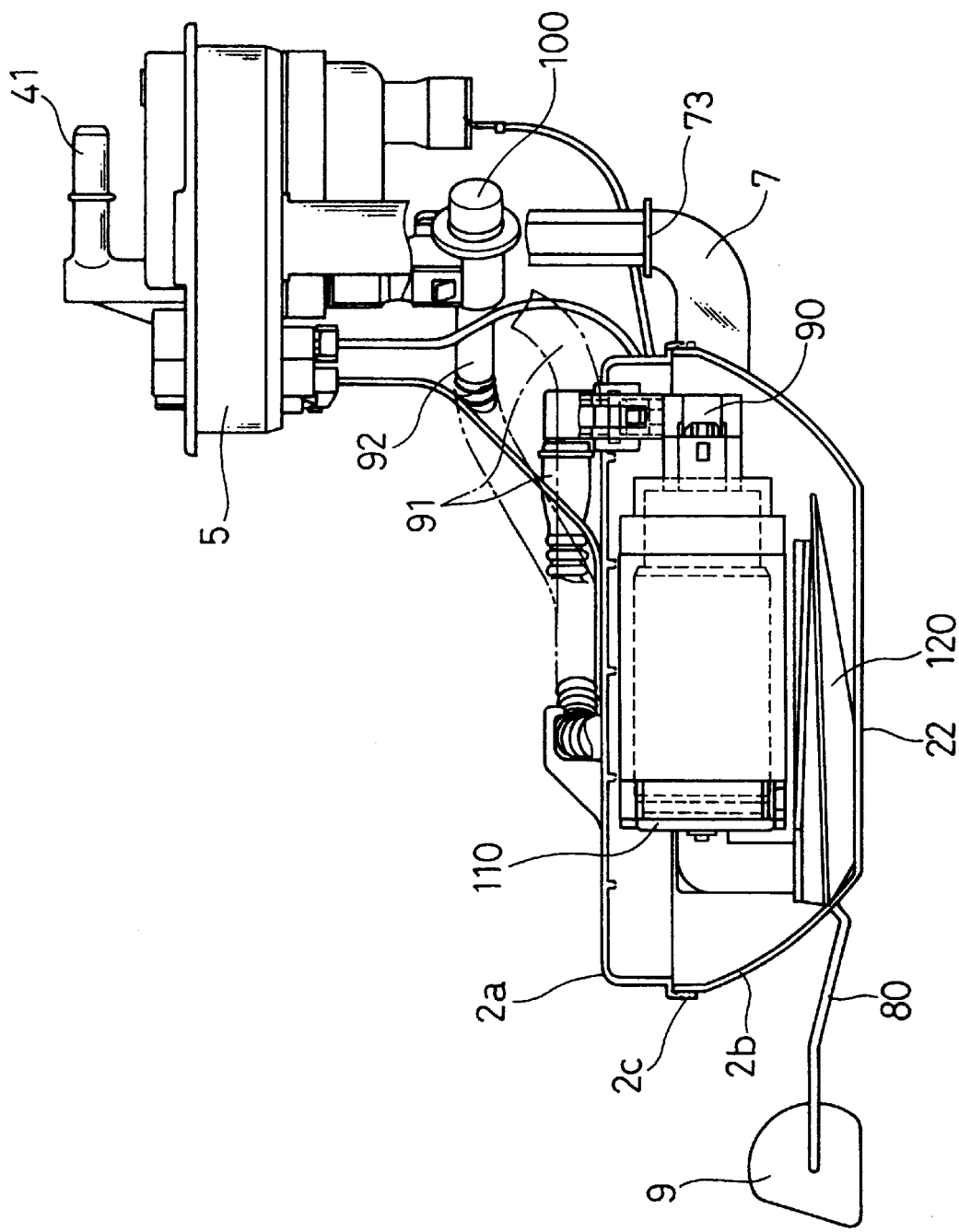
FIG. 2 is a partially sectional view showing a subtank 2 of the fuel supply apparatus for a vehicle according to the first embodiment of the present invention.

Preferred embodiments of the invention will now be described with reference to the accompanying drawings.

(First Embodiment)

A first embodiment of the present invention will now be described with reference to FIGS. 1 to 6.

This fuel supply apparatus 1 has a subtank 2 containing a fuel pump 110 and shaped like a flat, closed can, and is installed inside a plastic fuel tank 3.

An opening 30 of the fuel tank 3 is closed by a bracket (covering part) 5 constituting a part of the fuel supply apparatus 1 and fitted with a gasket 4. The bracket 5 has the shape of a thick disc with a lip, and a retainer 6 is screwed onto the outside of a cylindrical part 31 of the fuel tank 3 forming the opening 30 and seals the fuel tank 3 by pressing the lip of the bracket 5 and a circumferential edge portion of the gasket 4 against the end of the cylindrical part 31.

The bracket 5 has a protrusion 50 extending downward into the fuel tank 3, a pair of guide tubes (not shown) are formed at left and right side faces of the protrusion 50, and a pair of L-shaped slide plates (connecting members) 7 are so fitted in these guide tubes that they can move up and down.

The L-shaped slide plates 7 each have a cylindrical base end portion 71 extending in the vertical direction and a distal end portion 72 extending in the horizontal direction; a flangelike stopper 73 is provided around the lower end of each of the base end portions 71, and each stopper 73 is urged downward by a spring 8 having its base end supported by the bracket 5.

The distal end portions 72 of these L-shaped slide plates 7 rotatably support pins 20 projecting from left and right side faces of the subtank 2, and by this means the subtank 2 is so held that it can move up and down and autorotate in the plane of the movement of the L-shaped slide plates 7.

The reference numeral 9 represents a float mounted on a distal end of a float arm 80. The float arm 80 is rotatably supported by the subtank 2, and inside the subtank 2 a base end of the float arm 80 rotates a potentiometer of a fuel level sensor 81.

Pressurized fuel discharged from the fuel pump 110 in the subtank 2 is supplied to an internal combustion engine via a delivery pipe 90, a bellows-type hose 91 (a part thereof is shown by chain lines) connected to the delivery pipe 90, a pressure regulator 100, a filter inside the protrusion 50, a delivery pipe in the bracket 5, and a fuel delivery pipe 41.

Fuel which is not used at the internal combustion engine returns to the fuel tank 3 via the pressure regulator 100, a bellows-type hose 92 and a jet pump 130.

The jet pump 130 is fixed by a C-shaped fixing member 140 mounted on a lower subtank 2b. The jet pump 130 sucks fuel into the subtank 2 from the fuel tank 3 by negative pressure in a negative pressure chamber 131 caused by the returned fuel. The fuel pump 110 sucks the sucked fuel through a pump filter 120.

The shape of the subtank 2 will now be further described.

The subtank 2 comprises an upper subtank 2a and the lower subtank 2b. The lower subtank 2b is connected to an opening portion 2c of the upper subtank 2a by a snap fitting. The upper subtank 2a is provided for preventing fuel in the subtank 2 from leaking to the outside of the subtank 2 when the vehicle makes a turn or parks on a slope.

A corner portion between the front end face (the end face which is the first to abut with the bottom 32 of the fuel tank 3 when the subtank 2 is inserted into the fuel tank 3 while being turned) 21 of the subtank 2 and its bottom face 22 is chamfered, and similarly a corner part between the rear end face (the opposite end face from the front end face 21) 23 of the subtank 2 and its bottom face 22 is chamfered.

The operation of inserting this subtank 2 into the fuel tank 3 will now be described.

The subtank 2 is first inserted into the opening 30 of the fuel tank 3 from its front end face 21 and then is further inserted into the subtank 2 while being rotated in a vertical plane of rotation, and when the subtank 2 has rotated through about 90° its bottom face 22 seats upon the bottom 32 of the fuel tank 3.

Figure 4:
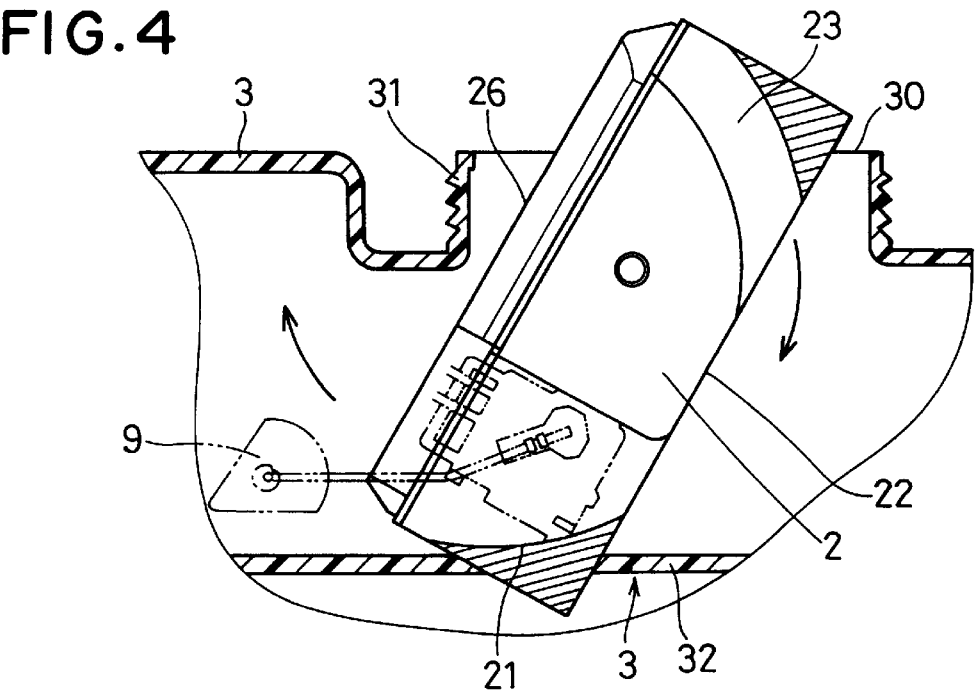
FIG. 4 is a schematic illustration for a part of a sectional view of the fuel supply apparatus showing an insertion process of the subtank 2 into a fuel tank 3 according to the first embodiment of the present invention.

A state wherein the front end face 21 of the subtank 2 is in contact with the bottom 32 of the fuel tank 3 and a part of the rear end face 23 of the subtank 2 still remains outside the opening 30 of the fuel tank 3 is shown in FIG. 4.

The subtank 2 is inserted into the fuel tank 3 from the state shown in FIG. 4 while being rotated in a vertical plane and moving forward somewhat. At this time, the front end face 21 rubs against the bottom 32 of the fuel tank 3 as it rotates, and the rear end face 23 makes contact with or comes close to the inner circumferential surface of the cylindrical part 31 of the fuel tank 3 as the subtank 2 rotates.

With this construction, because the front and rear end faces 21, 23 of the subtank 2 are chamfered as indicated by the hatched parts in FIG. 4, the subtank 2 can be easily inserted into the fuel tank 3 without the diameter of the opening 30 being enlarged, without the depth of the fuel tank 3 being increased, and without the capacity of the subtank 2 being reduced.

It can be understood from FIG. 4 that the capacity of the subtank 2 is maximized when its shape is such that in the course of its insertion into the fuel tank 3 the top face 26 of the subtank 2 just avoids rubbing against the lower end of the cylindrical part 31, the whole left-right width of the front end face 21 slides on the bottom 32 of the fuel tank 3, and the whole left-right width of the rear end face 23 makes contact with the inner circumferential surface of the cylindrical part 31.

After the subtank 2 seats upon the bottom 32 of the fuel tank 3, even if due to a fluctuation of fuel weight or a change in vehicle attitude the position of the bottom 32 of the fuel tank 3 changes with respect to the bracket 5 as a reference, because the subtank 2 is always urged toward the bottom 32 by the spring 8, and because the subtank 2 is also held in contact with the bottom 32 of the fuel tank 3 by its own weight, a fuel inlet (not shown) provided in the bottom face of the subtank 2 is held close to the bottom 32 of the fuel tank 3 at all times.

Also, because as mentioned above the subtank 2 rotates as it is inserted into the fuel tank 3 through the opening 30, it is possible to keep down the height of the subtank 2 while still providing it with the necessary capacity.

Figure 3:
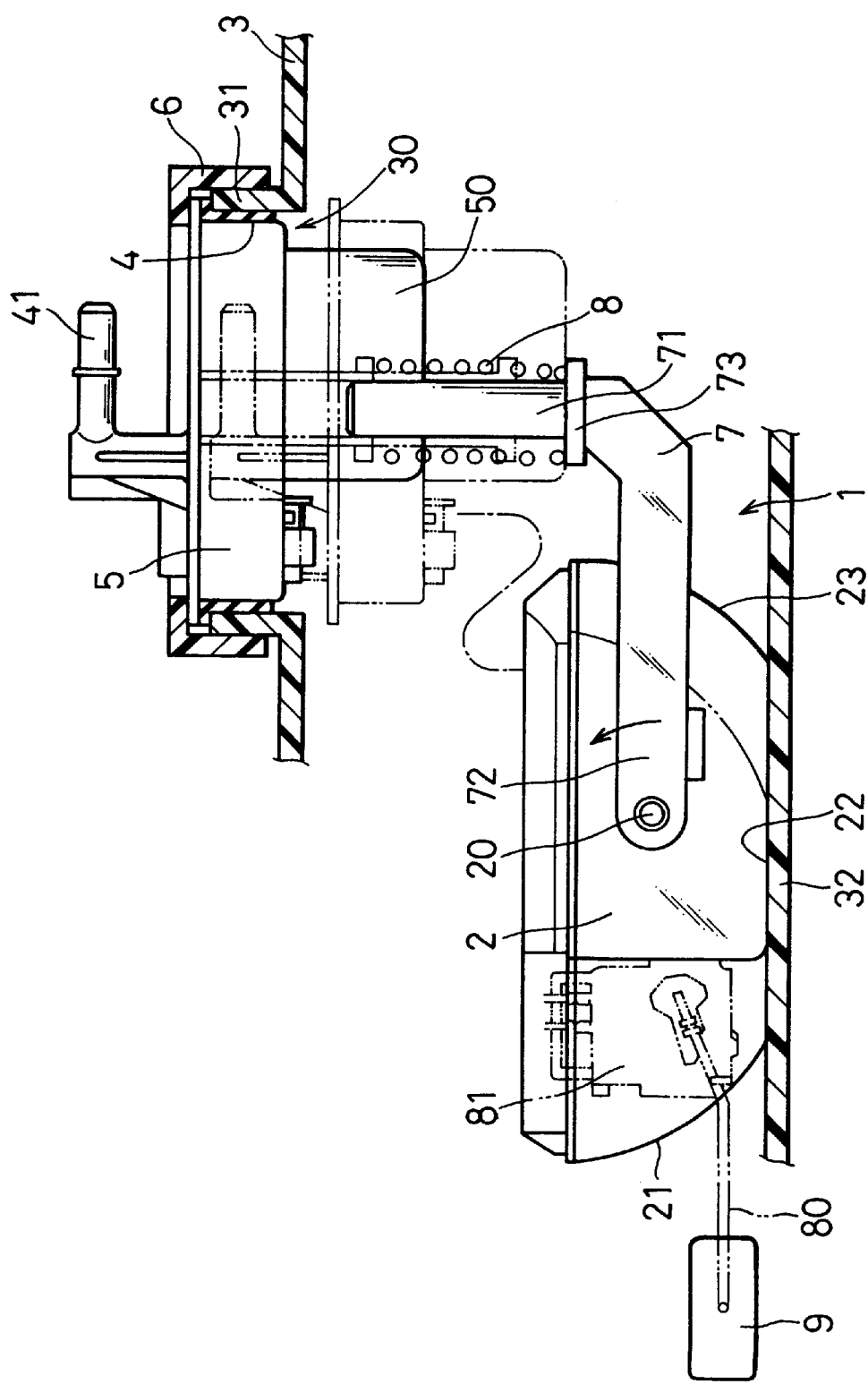
FIG. 3 is a schematic and partially sectional view showing a L-shaped plate 7 according to the first embodiment of the present invention.

Although FIG. 3 shows the bracket 5 and the upper part of the fuel tank 3 having moved down with the subtank 2 and the bottom 32 of the fuel tank 3 as a reference, the case of the subtank 2 and the bottom 32 of the fuel tank 3 moving up with the bracket 5 and the upper part of the fuel tank 3 as a reference is the same, and of course in either case the subtank 2 and the L-shaped slide plates 7 move vertically with respect to the bracket 5 to absorb displacements of the fuel tank 3.

Figure 5:
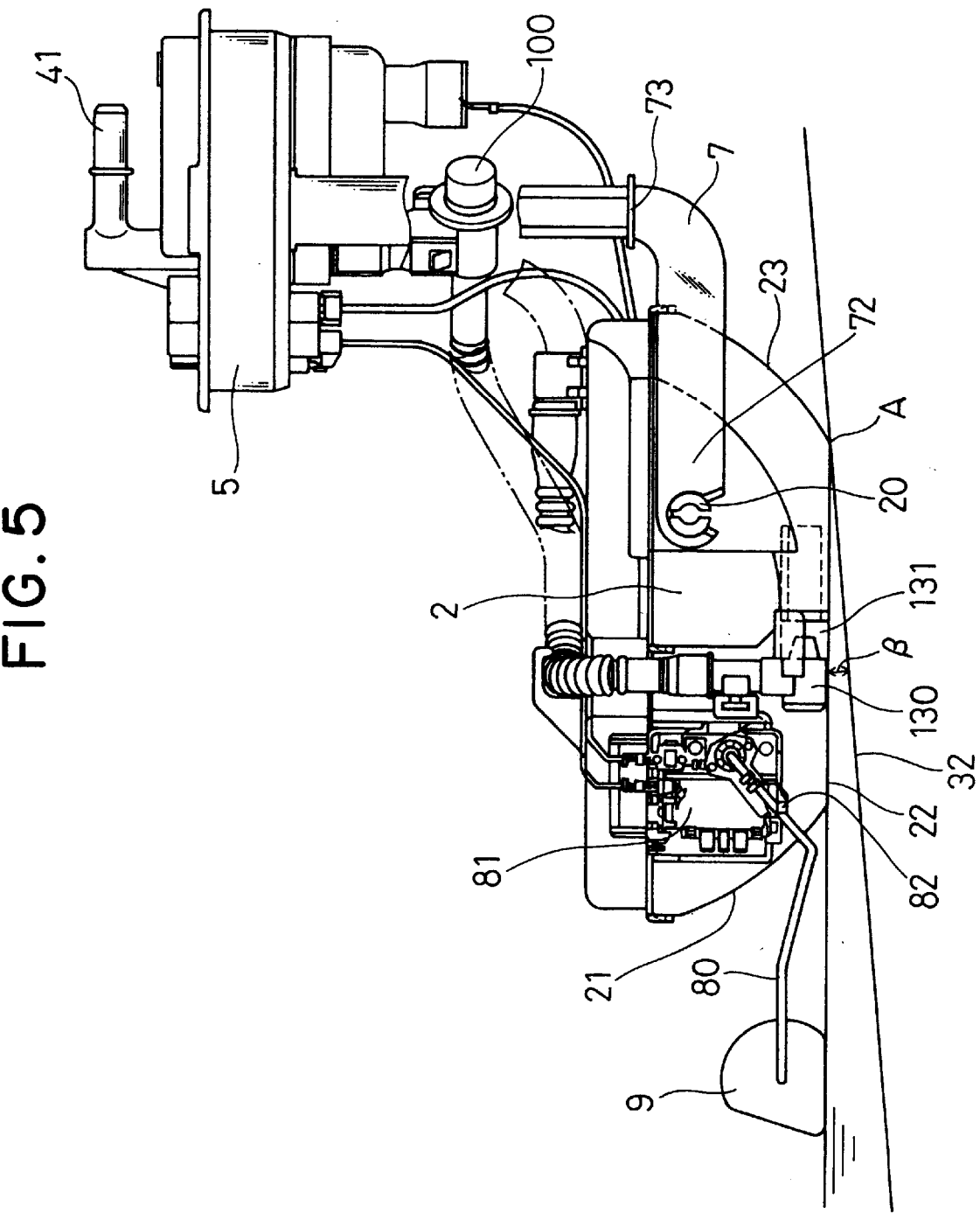
FIG. 5 is a schematic illustration showing a condition with an inclination of β degrees between a bottom surface of the fuel tank and the horizontal surface for the comparison with the first embodiment.

The subtank 2 not only rotates against the L-shaped plate 7 but also has the following features:

When a center portion of a flat and thin fuel tank deflects according to such as the weight of the fuel or inner pressure caused by vapors of the fuel, the float 9 indicates a fuel level lower than the actual fuel level if the float 9 is distant from the center portion of the fuel tank as shown in FIG. 5. FIG. 5 shows a hypothetical state that the subtank 2 does not follow the inclination of the bottom surface 32 of the fuel tank 3.

In FIG. 5, the center portion of the bottom surface 32 is lowered by the deflection, and an angle β is formed between the bottom surface 32 and the horizontal surface (that is the bottom surface 22 of the subtank 2) if the subtank 2 does not follow the inclination of the bottom surface 32 of the fuel tank 3. The bottom surface 22 of the subtank 2 contacts with the bottom surface 32 of the fuel tank 3 at point A. Under this hypothetical state, the float 9 indicates a fuel level lower than the actual fuel level. In other words, the fuel level detection error increases according to the inclination of the bottom surface 32 of the fuel tank 3 if the subtank 2 does not follow the inclination or deflection.

In FIG. 5, the angle α1 represents an angle corresponding to the fuel empty point when the bottom surface 32 of the fuel tank 3 is not inclined. The angle α2 represents an angle corresponding to the fuel empty point when the bottom surface 32 of the fuel tank 3 is inclined. As shown in FIG. 5, α2 is greater than α1. At the fuel empty point, the arm 80 is restricted by a stopper 82.

Figure 6:
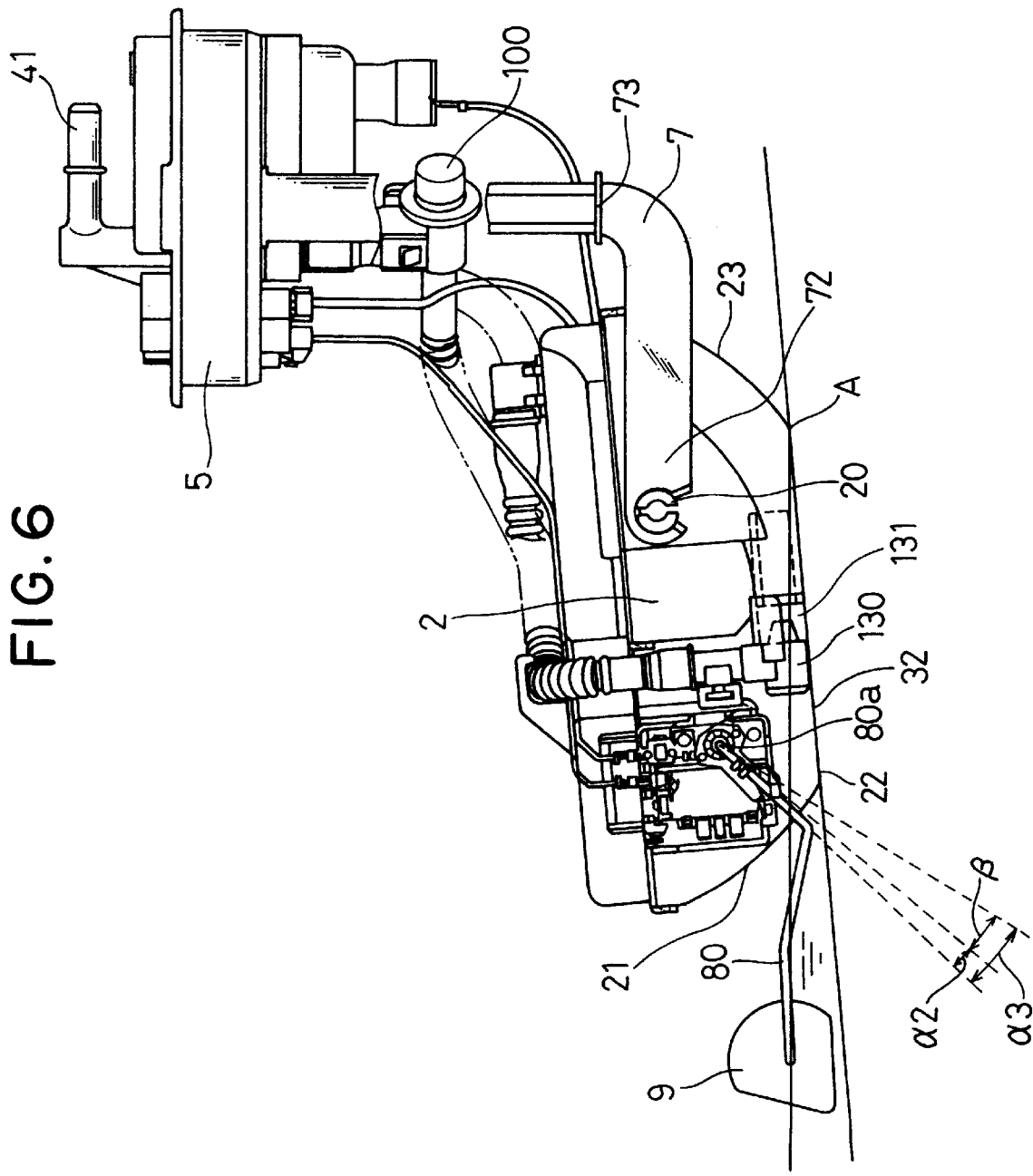
FIG. 6 is a schematic illustration showing an advantage of the first embodiment of the present invention.

Operations and advantages of the first embodiment will now be described with reference to FIG. 6 which is comparable to FIG. 5. FIG. 6 shows that the fuel tank bottom surface 32 inclines β degrees by distortion, and the subtank 2 follows the inclination.

According to the first embodiment of the present invention, the base end portion 71 of the L-shaped plate 7 is held by the bracket 5, and the distal end portion 72 rotatably supports the subtank 2 with the pin 20. Accordingly, the subtank 2 and a supporting point 80a follow the inclination β of the fuel tank by rotating the front arm 80 at the supporting point 80a.

In FIG. 6, α3 represents an arm angle corresponding to the fuel empty point (at the fuel empty point, the arm 80 is restricted by the stopper 82.). It is apparent that α3=α2+β. Accordingly, α3 is greater than α2. Therefore, the detection error in measuring the angle of the fuel level sensor 81 is reduced. Furthermore, repeated stress from the bottom surface 32 of the fuel tank 3 is prevented, thereby improving the durability.

According to the first embodiment of the present invention, the measurement angle is increased to compensate when the subtank 2 follows the inclination of the bottom surface 32 of the fuel tank 3. However, it may be modified to decrease the measurement angle when the subtank 2 follows the inclination of the bottom surface 32 of the fuel tank 3. Any modification may be possible if the deviation of the measurement angle of the fuel level sensor 81 is compensated such that the float level change caused by the inclination of the fuel tank 3 is canceled by making the reference angle of the fuel level sensor follow the inclination of the fuel tank 3. In other words, when the float level is decreased, the bottom surface 22 of the subtank 2 may be inclined to cancel such decrease, and when the float level is increased, the bottom surface 22 of the subtank 2 may be inclined to cancel such increase.

Furthermore, although the jet pump 130 can not suck fuel under the condition shown in FIG. 5, since the jet pump 130 rotates with the subtank 2 to follow the bottom surface 32 of the subtank 2, the jet pump 130 can suck fuel from outside the subtank 2 as shown in FIG. 6.

(Second Embodiment)

Figure 7:
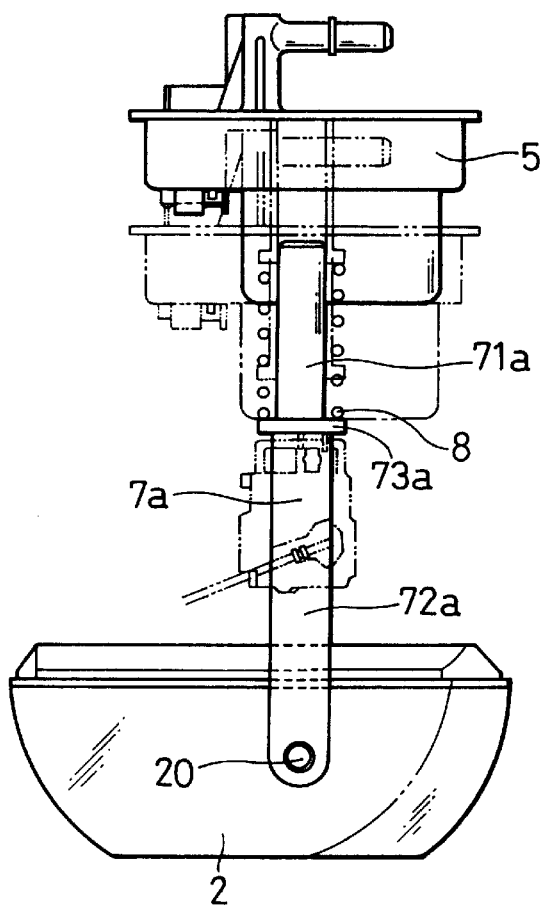
FIG. 7 is a schematic illustration showing a part of a fuel supply apparatus for a vehicle according to a second embodiment of the present invention.

A second embodiment of a fuel supply apparatus according to the present invention is shown in FIG. 7.

In this fuel supply apparatus 1, the left-right pair of L-shaped slide plates 7 shown in the first preferred embodiment have been changed to straight barlike slide plates 7a extending downward. That is, each of these slide plates 7a has a cylindrical base end portion 71a extending vertically and a distal end portion 72a extending downward from the lower end of the base end portion 71a; a flangelike stopper 73a is provided on the lower end of the base end portion 71a, and the stopper 73a is urged downward by a spring 8 having its base end supported by the bracket 5.

The distal end portions 72a of this left-right pair of slide plates 7a rotatably support pins 20 projecting from left and right side faces of the subtank 2, and by this means the subtank 2 is so held that it can move up and down and autorotate in the plane of movement of the slide plates 7a.

The operation of inserting this subtank 2 into the fuel tank 3 is substantially the same as in the case of the first preferred embodiment and therefore will not be described here, and the point that the necessary capacity of the subtank 2 can be provided without enlarging the opening 30 and while keeping down the height of the subtank 2 is also the same as in the first preferred embodiment.

Furthermore, according to the second embodiment, because the direction of the force applied to the base end portions 71a of the slide plates 7a by the subtank 2 when the fuel supply apparatus 1 is inserted into the fuel tank 3 is substantially the same as the vertical direction of movement of the base end portions 71a, there is the advantage that the vertical movement of the base end portions 71a is not hindered by twisting or rubbing and thus this movement can be made smooth.

(Third Embodiment)

Figure 8:
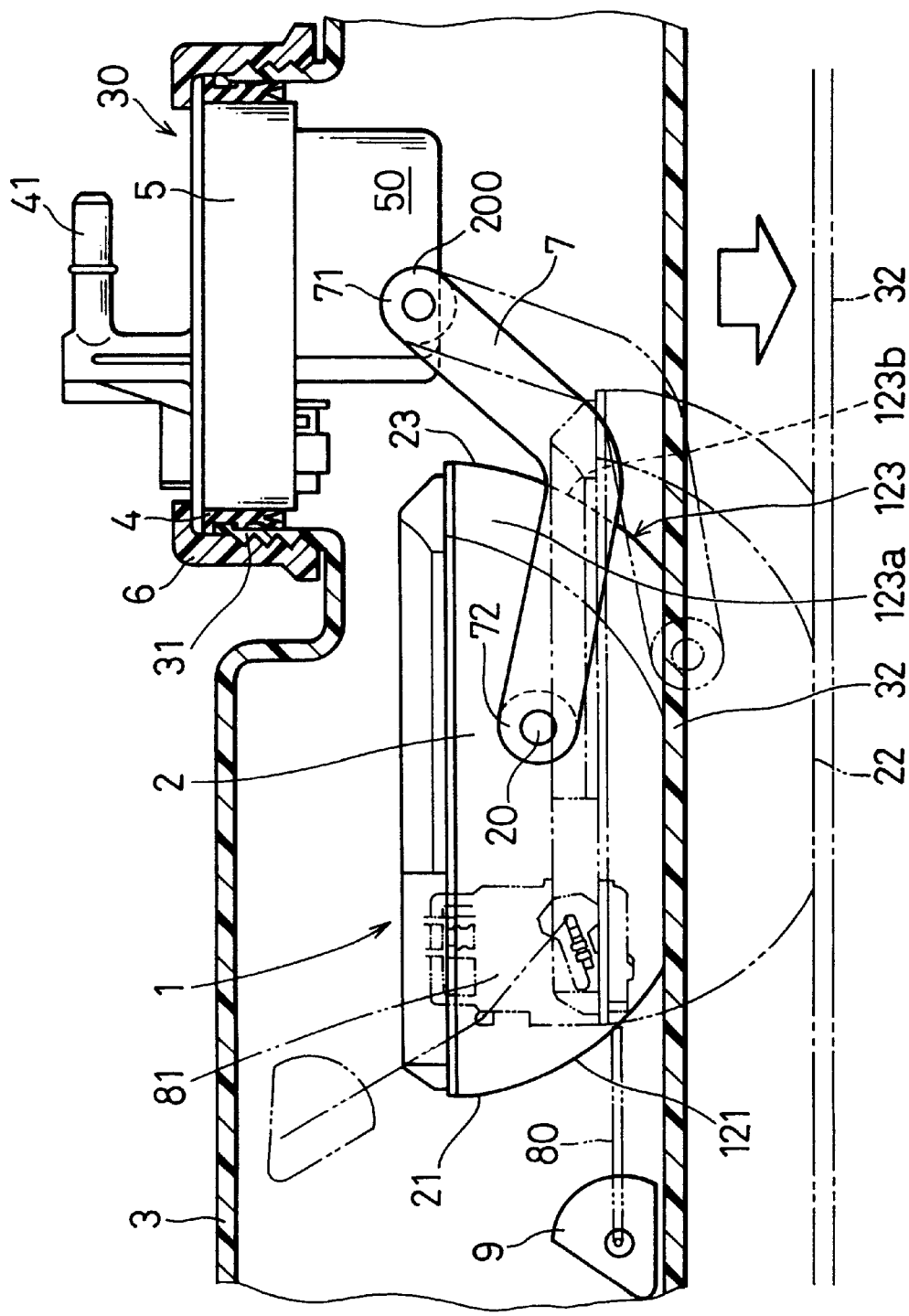
FIG. 8 is a schematic and partially sectional view showing a fuel supply apparatus for a vehicle according to a third embodiment of the present invention.
Figure 9:
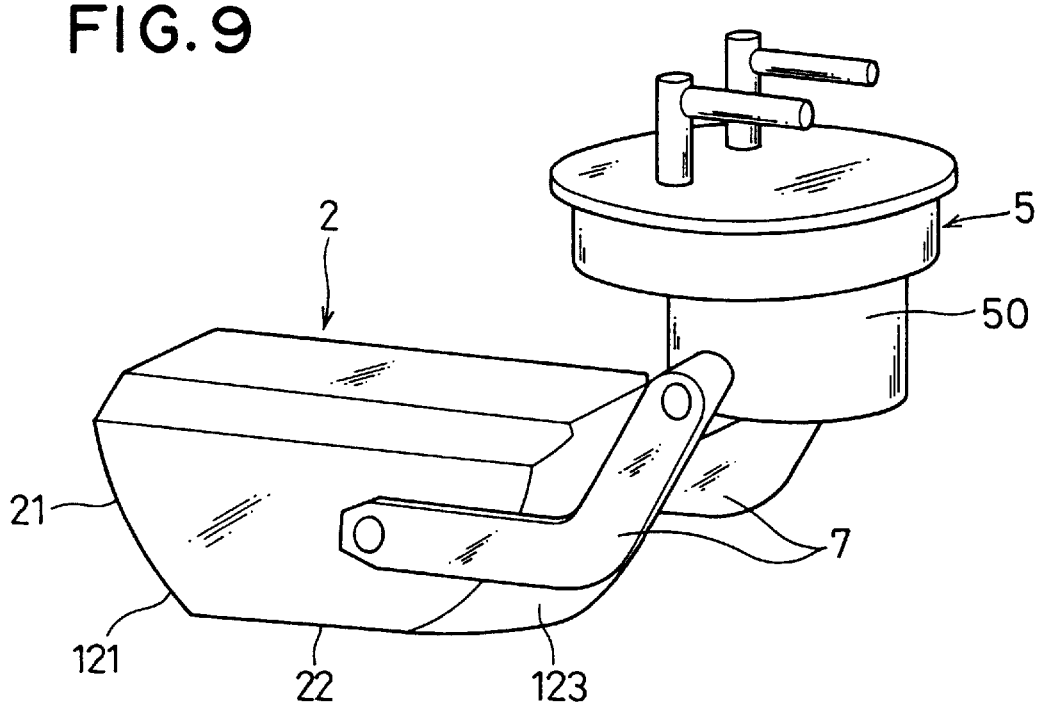
FIG. 9 is a perspective illustration of the fuel supply apparatus for a vehicle according to the third embodiment of the present invention.

FIG. 8 is a schematic and partially sectional view showing a fuel supply apparatus for a vehicle according to a third embodiment of the present invention, and FIG. 9 is a perspective illustration of the fuel supply apparatus of the third embodiment.

In the third embodiment, components which are substantially the same as those in the previous embodiments are assigned the same reference numerals and their otherwise repeated explanations are omitted hereinafter.

As shown in FIGS. 8 and 9, base end portions 71 of a pair of boomerang-shaped link plates 7 are supported by the protrusion 50 so as to rotate. Springs 200 are provided between the protrusion 50 and the link plate 7 to urge the link plate 7 toward the bottom surface 32 of the fuel tank 3.

The distal end portions 72 of these L-shaped link plates 7 rotatably support pins 20 projecting from left and right side faces of the subtank 2, and by this means the subtank 2 is so held that it can revolve on its axis and revolve around the supporting point between the protrusion 50 and the link plate 7 in the plane of the movement of the L-shaped link plates 7.

The reference numeral 9 represents a float mounted on a distal end of a float arm 80. The float arm 80 is rotatably supported by the subtank 2, and inside the subtank 2 a base end of the float arm 80 rotates a potentiometer of a fuel level sensor 81.

Pressurized fuel discharged from a fuel pump in the subtank 2 is supplied to an internal combustion engine via a filter inside the protrusion 50 and a fuel delivery pipe 41 extending outwardly from the bracket 5.

The shape of the subtank 2 will now be further described.

A corner portion between the front end face (the end face which is the first to abut with the bottom 32 of the fuel tank 3 when the subtank 2 is inserted into the fuel tank 3 while being turned) 21 of the subtank 2 and its bottom face 22 is chamfered to form a front chamfer 121, and similarly a corner part between the rear end face (the opposite end face from the front end face 21) 23 of the subtank 2 and its bottom face 22 is chamfered to form a rear chamfer 123.

The front chamfer 121 has a shape of a pipe which is perpendicular to a swing plane of the subtank 2. Right and left longitudinal edges 123a of the rear chamfer 123 are further chamfered than a central longitudinal portion 123b of the rear chamfer 123.

The operation of inserting this subtank 2 into the fuel tank 3 will now be described.

The subtank 2 is first inserted into the opening 30 of the fuel tank 3 from its front end face 21 and then is further inserted into the subtank 2 while being rotated in a vertical plane of rotation, and when the subtank 2 has rotated through about 90° its bottom face 22 seats upon the bottom 32 of the fuel tank 3.

Figure 10:
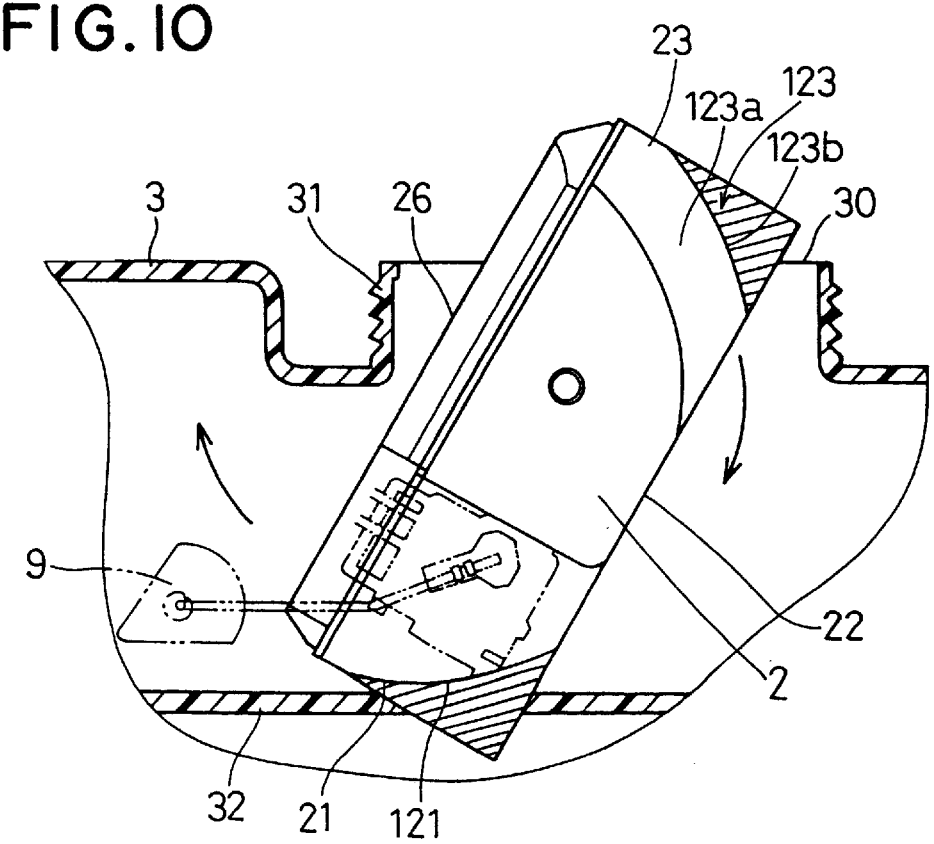
FIG. 10 is a schematic illustration for a part of a sectional view of the fuel supply apparatus showing an insertion of the subtank 2 into a fuel tank 3 according to the third embodiment of the present invention.

A state wherein the front chamfer 121 of the subtank 2 is in contact with the bottom surface 32 of the fuel tank 3 and a part of the rear chamfer 123 of the subtank 2 still remains outside the opening 30 of the fuel tank 3 is shown in FIG. 10.

The subtank 2 is inserted into the fuel tank 3 from the state shown in FIG. 10 while being rotated in a vertical plane and moving forward somewhat. At this time, the front chamfer 121 rubs against the bottom surface 32 of the fuel tank 3 as it rotates, and the rear chamfer 123 makes contact with or comes close to the inner circumferential surface of the cylindrical part 31 of the fuel tank 3 as the subtank 2 rotates.

With this construction, because the front and rear end faces 21, 23 of the subtank 2 are chamfered as indicated by the hatched parts in FIG. 10, and because the right and left longitudinal edges 123a of the rear chamfer 123 are further chamfered than a central longitudinal portion 123b of the rear chamfer 123, the subtank 2 can be easily inserted into the fuel tank 3 without the diameter of the opening 30 being enlarged, without the depth of the fuel tank 3 being increased, and without the capacity of the subtank 2 being reduced.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A fuel supply apparatus for a vehicle having a fuel tank, comprising:
   a bracket disposed at an opening of the fuel tank;
   a subtank to be disposed in the fuel tank, said subtank having a bottom surface which is seatable on a bottom surface of the fuel tank;
   a connecting member having a base end portion and a distal end portion;
   an elastic member for pushing said connecting member toward said bottom surface of the fuel tank; and
   a fuel pump housed in said subtank for discharging fuel through said bracket, wherein; said base end portion of the connecting member is supported by said bracket, and said subtank is rotatably supported by said distal end portion of the connecting member, wherein;

said subtank is rotatably supported by said bracket via said connecting member;
said subtank has a front surface that first contacts said bottom surface of said fuel tank when said subtank is inserted into said fuel tank, and has a rear surface disposed opposite said front surface;
distance between said front surface and said rear surface is greater than a diameter of said opening of said fuel tank; and
said front surface and said rear surface have a chamfered front surface and a chamfered rear surface, respectively, which are chamfered toward said bottom surface of said bracket.

2. A fuel supply apparatus as in claim 1, wherein said connecting member is a link which supports said subtank rotatably in a predetermined plane and which is supported by said bracket rotatably in said predetermined plane.

3. A fuel supply apparatus as in claim 1, wherein a left edge portion and a right edge portion of said chamfered rear surface are further chamfered than a central portion of said chamfered rear surface.

4. A fuel supply apparatus as in claim 2, wherein said chamfered front surface has a shape of a part of a pipe which is vertical to said predetermined plane.

* * * * *